(12) United States Patent
Matsubara et al.

(10) Patent No.: US 7,825,619 B2
(45) Date of Patent: Nov. 2, 2010

(54) METHOD AND APPARATUS FOR CONTROLLING STOPPING OF VIBRATION GENERATING STEPPING MOTOR

(75) Inventors: Masaki Matsubara, Yonago (JP); Kazuaki Sato, Yonago (JP); Mikio Umehara, Yonago (JP); Toshiaki Tsuzaki, Yonago (JP)

(73) Assignee: Minebea Motor Manufacturing Corporation, Tokyo (JP)

( * ) Notice: Subject to any disclaimer, the term of this patent is extended or adjusted under 35 U.S.C. 154(b) by 796 days.

(21) Appl. No.: 11/794,331

(22) PCT Filed: Dec. 28, 2006

(86) PCT No.: PCT/JP2006/326281
§ 371 (c)(1),
(2), (4) Date: Jun. 28, 2007

(87) PCT Pub. No.: WO2007/077935
PCT Pub. Date: Jul. 12, 2007

(65) Prior Publication Data
US 2008/0129232 A1   Jun. 5, 2008

(30) Foreign Application Priority Data
Dec. 28, 2005   (JP) .............................. 2005-377847

(51) Int. Cl.
*H02P 8/00*   (2006.01)
*H02P 8/32*   (2006.01)
(52) U.S. Cl. ...................... 318/685; 318/696; 318/362; 318/703
(58) Field of Classification Search ................ 318/114, 318/261, 264, 265, 269, 272, 273, 362, 611, 318/685, 696, 702, 703
See application file for complete search history.

(56) References Cited

U.S. PATENT DOCUMENTS

| | | | | |
|---|---|---|---|---|
| 3,760,252 A | * | 9/1973 | Beery | 318/611 |
| 4,536,691 A | * | 8/1985 | Sakakibara | 318/696 |
| 5,724,617 A | * | 3/1998 | Hirano et al. | 396/55 |
| 6,078,156 A | * | 6/2000 | Spurr | 318/368 |

(Continued)

FOREIGN PATENT DOCUMENTS

JP   63-290198   11/1988

(Continued)

*Primary Examiner*—Walter Benson
*Assistant Examiner*—Eduardo Colon
(74) *Attorney, Agent, or Firm*—Foley & Lardner LLP (57) ABSTRACT

A method for controlling stopping of a vibration generating stepping motor is a method for controlling the stopping of an vibration generating stepping motor by a control unit, characterized in that the method includes: stopping a supply of a driving pulse to the vibration generating stepping motor while applying a driving voltage to the vibration generating stepping motor; applying the driving voltage to the stepping motor, which does not completely stop, for an optimum braking time according to a motor configuration of the stepping motor, so as to brake the stepping motor; and stopping the applying of the driving voltage to the stepping motor which is rotating under inertia after the elapse of the optimum braking time.

14 Claims, 8 Drawing Sheets

U.S. PATENT DOCUMENTS

| | | | | |
|---|---|---|---|---|
| 6,106,176 | A | * | 8/2000 | Yanagisawa et al. ...... 400/615.2 |
| 6,601,513 | B1 | * | 8/2003 | Ozawa ........................ 101/485 |
| 7,038,411 | B2 | * | 5/2006 | Nireki et al. ................. 318/370 |
| 7,626,352 | B2 | * | 12/2009 | Hoda .......................... 318/685 |
| 2004/0222760 | A1 | * | 11/2004 | Nireki et al. ................. 318/362 |
| 2006/0284581 | A1 | * | 12/2006 | Mullin et al. ................ 318/362 |

FOREIGN PATENT DOCUMENTS

| JP | 2-136098 | 5/1990 |
|---|---|---|
| JP | 6-235777 | 8/1994 |

* cited by examiner

RELATIONSHIP BETWEEN STOPPING TIME AND BRAKING TIME

METHOD AND APPARATUS FOR CONTROLLING STOPPING OF VIBRATION GENERATING STEPPING MOTOR

TECHNICAL FIELD

The present invention relates to a method and apparatus for controlling stopping of a vibration generating stepping motor, which attains an accurate stopping position and reduces power consumption required for performing the stopping operation.

BACKGROUND ART

Since a stepping motor has inertia in a rotor thereof, even if there is no load in the stepping motor, the rotor rotates in steps by the number of pulse inputted and then the stepping motor stops at a predetermined angle after damping the amplitude of reciprocating motions thereof with overshooting and undershooting angles. Magnetic flux is generated from excited pole teeth of a stator yoke during such a transient response. When the rotor vibrates in such a way as to cut off the magnetic flux, a change in magnetic flux is generated which corresponds to a deflection amount of the rotor relative to the stabilizing point. As a result, a back electromotive voltage is generated. This back electromotive voltage influences an exciting current to thereby generate a vibrating current. The rotor is driven by a voltage resulting from adding a vibrating voltage to a supply voltage. Reverse effects appear in settling time and stopping position accuracies due to stiffness characteristics of the stepping motor, frictional resistance in an interior of the motor and the like, in addition to the vibrating voltage.

The stiffness characteristics are a relationship between quantity of load applied externally to an output shaft of the stepping motor and an angle through which the stepping motor is displaced by the load when the stepping motor is excited by a direct current, and denote a restoring force to the stabilizing point. According to the stiffness characteristics, when a load of the stepping motor attempts to be positioned, since the accuracy becomes better in the event that a displacement angle θL with respect to a load torque TL is smaller, the stepping motor is desired to have a larger maximum static torque (a holding torque) TM.

According to the stiffness characteristics, when the position of the rotor deviates from the stabilizing point in the excited state, a torque is generated in the rotor in an opposite direction to that in which the torque has been generated until then. In addition, also in the event that excitation of the excited pole is cancelled, when the rotor is caused to deviate from the stabilizing point, a torque attempting to attract the excited pole (a detent torque) is generated, so as to attract the rotor back. In addition, when a frictional resistance Tr is present, since the rotor cannot rotate without a torque which can overcome the frictional resistance Tr, the rotor has a dead zone equal to an angle of rotation +/−θ due to the frictional resistance Tr, whereby a static angle error equal to the dead zone is generated. When discussing here about dead zone, a dead zone for a detent torque is larger than a dead zone for a holding torque. This is due to a difference in inclination of torque characteristic curves. The angle error becomes larger when attempting to hold the rotor only by a detent torque which is smaller in magnitude of torque.

There are the following methods as stopping position control methods.

(1) There is a control method in which by using a motor in which a holding torque stabilizing point and a detent torque stabilizing point are made to match each other, energization is discontinued after driving is completed, so that a rotor is to be held by a detent torque thereafter. In this case, since a detent torque is much smaller than a holding torque, an angle deviation corresponding to the static angle error θ becomes very large. Consequently, when adopting the aforesaid stepping motor control method, energization needs to be discontinued after the oscillation of the rotor has sufficiently been damped by the holding torque working during energization, so that the rotor is then held by the holding torque (refer to Patent Document No. 1).

(2) There is a control method in which a magnetic pole in a stator, which corresponds to the angle of rotation at which a rotor is to be stopped, is excited, and the excitation is cancelled when the rotor is attracted to the magnetic pole and stopped, so that the position of the rotor is held only by a detent torque thereafter. However, since there is present inertia in the rotor, it is inevitable that oscillations continue to repeat relative to the rotational direction of the rotor until the rotor is brought to a complete stop. Then, although after oscillations have sufficiently been dampened by a holding torque, the rotor is held by detent torque, in a normal using state, ample time has to be spent implementing holding i.e., energization so that oscillations are dampened sufficiently so as not to cause neither positional deviation nor step-out. Consequently, energization volume is increased and control time is extended. In addition, when used under abnormal environment in terms of vibration, temperature, humidity and the like, oscillations especially become large and cannot be suppressed properly within a holding time which is determined by anticipating holding under the normal conditions, leading to step-out. (Refer to Patent Document No. 1).

(3) There is a control method for detecting the oscillating state of a rotor by a detector to control the duration of energizing a winding to obtain a holding torque to suppress the vibration of the rotor based on a detection output of the detector.

According to this control method, the vibration of the stepping motor is electrically detected when controlling the stopping of the stepping motor, and the excited magnetic pole at the stopping position continues to be excited by the duration corresponding to the detection output relating to the vibrating state of the rotor in order to hold the rotor by means of energization until the oscillating amount decreases below a predetermined amount. Thereafter, the excitation is discontinued so that the holding of the rotor is switched to holding by a detent torque. By this configuration, the required minimum amount of holding torque is given, and the holding of the rotor is switched to the holding by the detent torque at the stage where the holding by the detent torque suffices. (Refer to Patent Document No. 1).

The control method described in the above (3) provides the following issues.

Since inertia is present in the rotor, it is inevitable that vibrations repeat relative to the rotational direction of the rotor until the rotor stops completely. Then, the rotor is held by the detent torque after the vibrations are dampened sufficiently by the holding torque. However, in a case where the load is a vibration generating weight which has a large mass, the magnitude of vibration that continues to be generated until the rotor stops becomes extremely large when compared with a load which is considered to have nothing to do with generation of vibrations (such as a weight which is not used substantially for generating vibrations), and although vibrations are averaged out while the rotation speed is high, vibrations tend to be become conspicuous one by one as the rotation speed decreases. Because of this, there are caused the following issues; it is difficult to detect a condition where the vibration amount becomes equal to or lower than a specific amount by detecting the vibration amount, and as a result of continuation of the holding control over a long period of time, the rotor suddenly stops immediately after the action on the detent torque, or the rotor comes to balance with the weight constituting the load to stop in a position which largely overshoots or undershoots the stabilizing position.

Patent Document No. 1: JP-A-2-136098

DISCLOSURE OF THE INVENTION

Problem which the Invention is to Solve

In view of the issues mentioned above, an object of the invention is to provide a method and apparatus for controlling the stopping of a vibration generating steeping motor, which enable the implementation of a stopping control of a rotor with good accuracy within a short period of time and which can save power.

Means for Solving the Problem

Specific means for solving the problem will be described as follows.

(1) A method for controlling stopping of a vibration generating stepping motor is a method for controlling stopping of a vibration generating stepping motor by a control apparatus and is characterized in that the method comprises: stopping a supply of a driving pulse to the vibration generating stepping motor while applying a driving voltage to the vibration generating stepping motor; applying the driving voltage to the stepping motor, which does not completely stop, for an optimum braking time according to a motor configuration of the stepping motor, so as to brake the stepping motor; and stopping the applying of the driving voltage to the stepping motor which is rotating under inertia after the elapse of the optimum braking time.

(2) The method for controlling stopping of a vibration generating stepping motor as set forth in (1) above, wherein the optimum braking time is made to be a time which enables a rotor of the stepping motor to stop in a predetermined stable stopping position after rotating under inertia when the applying of the driving voltage is stopped at the end of the optimum braking time.

(3) The method for controlling stopping of a vibration generating stepping motor as set forth in (1) or (2) above, wherein the optimum braking time is made to be a braking time which results at a point in a characteristic curve representing a change in stopping time relative to braking time of the stepping motor, the point being an intersection point of a portion in the characteristic curve whose inclination is steep with a portion in the characteristic curve whose inclination is moderate and where a stopping time is substantially constant.

(4) The method for controlling the stopping of a vibration generating stepping motor as set forth in (3) above, wherein the characteristic curve is a characteristic curve in accordance with the mass of a vibration generating weight of the stepping motor.

(5) The method for controlling the stopping of a vibration generating stepping motor as set forth in (1) or (2) above, wherein the optimum braking time is made to be an optimum braking time for a weight mass of the stepping motor among optimum braking times for each possible weight mass of the stepping motor, the optimum braking times being obtained from a characteristic curve of a stopping time when no brake is applied relative to the weight mass.

(6) The method for controlling stopping of a vibration generating stepping motor as set forth in (1) or (2) above, wherein the optimum braking time is made to be an optimum braking time for a weight mass of the stepping motor among optimum braking times for each possible weight mass of the stepping motor, the optimum braking times being obtained from a characteristic curve of a stopping time when complete braking is attained relative to the weight mass.

(7) The method for controlling stopping of a vibration generating stepping motor as set forth in any one of (1) to (6) above, wherein when the supply of driving pulses is stopped, the driving voltage is decreased so that a value of a current supplied to a coil of the stepping motor is decreased to or below a value of a permissible current.

(8) An apparatus for controlling stopping of a vibration generating stepping motor, comprising: a control unit that executes a procedure of a program to output a necessary signal; a switching circuit that receives the signal output from the control unit and switches a current to a coil of the stepping motor; a low-voltage power supply and a high-voltage power supply that are connected to a feeding path to the coil; a power supply cut-off circuit that receives the output signal from the control unit and cuts off the low-voltage power supply and the high-voltage power supply from the feeding path; and a current chopper circuit that receives the output signal from the control unit, and cuts off the high-voltage power supply from the feeding path and executes a constant-current control in the feeding path, the stopping of the stepping motor being controlled by the control unit, wherein the procedure of the program executed by the control unit comprises: stopping a supply of a driving pulse to the vibration generating stepping motor while applying a driving voltage to the vibration generating stepping motor; applying the driving voltage to the stepping motor, which does not completely stop, for an optimum braking time according to a motor configuration of the stepping motor, so as to brake the stepping motor; and stopping the applying of the driving voltage to the stepping motor which is rotating under inertia after the elapse of the optimum braking time.

(9) The apparatus for controlling stopping of a vibration generating stepping motor as set forth in (8) above, wherein the optimum braking time is made to be a time which enables a rotor of the stepping motor to stop in a predetermined stable stopping position after rotating under inertia when the applying of the driving voltage is stopped at the end of the optimum braking time.

(10) The apparatus for controlling stopping of a vibration generating stepping motor as set forth in (8) or (9) above, wherein the optimum braking time is made to be a braking time which results at a point in a characteristic curve representing a change in stopping time relative to braking time of the stepping motor, the point being an intersection point of a portion in the characteristic curve whose inclination is steep with a portion in the characteristic curve whose inclination is moderate and where a stopping time is substantially constant.

(11) The apparatus for controlling stopping of a vibration generating stepping motor as set forth in (10) above, wherein the characteristic curve is a characteristic curve in accordance with the mass of a vibration generating weight of the stepping motor.

(12) The apparatus for controlling stopping of a vibration generating stepping motor as set forth in (8) or (9) above, wherein the optimum braking time is made to be an optimum braking time for a weight mass of the stepping motor among optimum braking times for each possible weight mass of the stepping motor, the optimum braking times being obtained from a characteristic curve of a stopping time when no brake is applied relative to the weight mass.

(13) The apparatus for controlling stopping of a vibration generating stepping motor as set forth in (8) or (9) above, wherein the optimum braking time is made to be an optimum braking time for a weight mass of the stepping motor among optimum braking times for each possible weight mass of the stepping motor, the optimum braking times being obtained from a characteristic curve of a stopping time when complete braking is attained relative to the weight mass.

(14) The apparatus for controlling stopping of a vibration generating stepping motor as set forth in any one of (8) to (13) above, wherein when the supply of driving pulses is stopped, the driving voltage is decreased so that a value of a current supplied to the coil of the stepping motor is decreased to or below a value of a permissible current.

Advantage of the Invention

The method and apparatus for controlling stopping of a vibration generating stepping motor of the invention provides the following advantages.

(1) After the supply of a driving pulse is stopped, a brake is applied to the rotor for the optimum braking time, and after the application of the brake is cancelled, the rotor is caused to rotate under inertia to stop of itself. By this configuration, since the stopping of the rotor at the stabilizing point can be implemented accurately to thereby reduce wasteful overshooting and undershooting, a time required until the stopping can be made short, and since no brake is applied until the rotor stops completely, current consumption can be reduced.

(2) Since the brake can be applied with the low voltage than the voltage applied at the time of driving, the generation of abnormal current can be prevented, and current consumption can be reduced.

BRIEF DESCRIPTION OF THE DRAWINGS

FIGS. (8a) and 8(b) are explanatory diagrams of a stopping time control of a stepping motor stopping control unit for another type of the invention.

DESCRIPTION OF REFERENCE NUMERALS 1 outer rotor type vibration generating stepping motor;
2 interface board;
3 cover;
3a disc portion;
3b cylindrical portion;
4 rotor;
5 stator;
6 stator yoke;
6a first stator yoke;
6b second stator yoke;
6c third stator yoke (center yoke);
6d opening;
6e cut-out;
6f disc portion;
6g cylindrical portion;
6h pole tooth;
7 coil bobbin;
8 coil;
9 ring magnet;
10 shaft;
10a projecting portion having reduced diameter;
11 rotor frame;
11a opening;
11b disc portion;
11c cylindrical portion;
12 bearing;
13 weight portion;
14 washer;
21 stop control unit;
22 MPU;
23 control signal generating circuit;
24 switching circuit;
25a to 25d power transistor;
26, 32, 35, 38 diode;
27 current chopper circuit;
28 power supply cut-off circuit;
30 control circuit;
31, 34, 37 transistor;
33 resistor;
36 comparator.

BEST MODE FOR CARRYING OUT THE INVENTION

A stepping motor needs to stop in a stabilizing position for start for a subsequent step operation. Although there is caused no serious issue in case a load is light, in the event that a heavy eccentric weight constitutes a load as when it is used as an vibration generating motor, it becomes a most crucial issue to cause the stepping motor to stop in the stabilizing position. For this reason, a proper damping procedure is required. Then, data were acquired under the following conditions.

(Relationship between Braking Time and Stopping Time)

Table 1 shows a "stopping time versus braking time characteristics" taken by mass of weight as load on a stepping motor having as conditions a diameter ($\phi$) of 10 mm, a height (H) of 3 mm and a revolution speed of 8500 rpm.

TABLE 1

|                   | Weight mass (g) |        |         |         |
|-------------------|-----------------|--------|---------|---------|
| Braking time (ms) | 0.00            | 0.16   | 0.31    | 0.34    |
| 0                 | 71              | 115    | 140     | 177     |
| 10                | 45              | 80     | 104     | 136     |
| 15                | —               | 69     | —       | —       |
| 20                | (A1) 20         | 50     | 94      | 126     |
| 25                | —               | (A2) 43| —       | —       |
| 30                | 20              | 40     | (A3) 59 | (A4) 88 |
| 40                | 20              | 37     | 58      | 87      |
| 50                | 20              | 37     | 56      | 87      |

Figure 2:
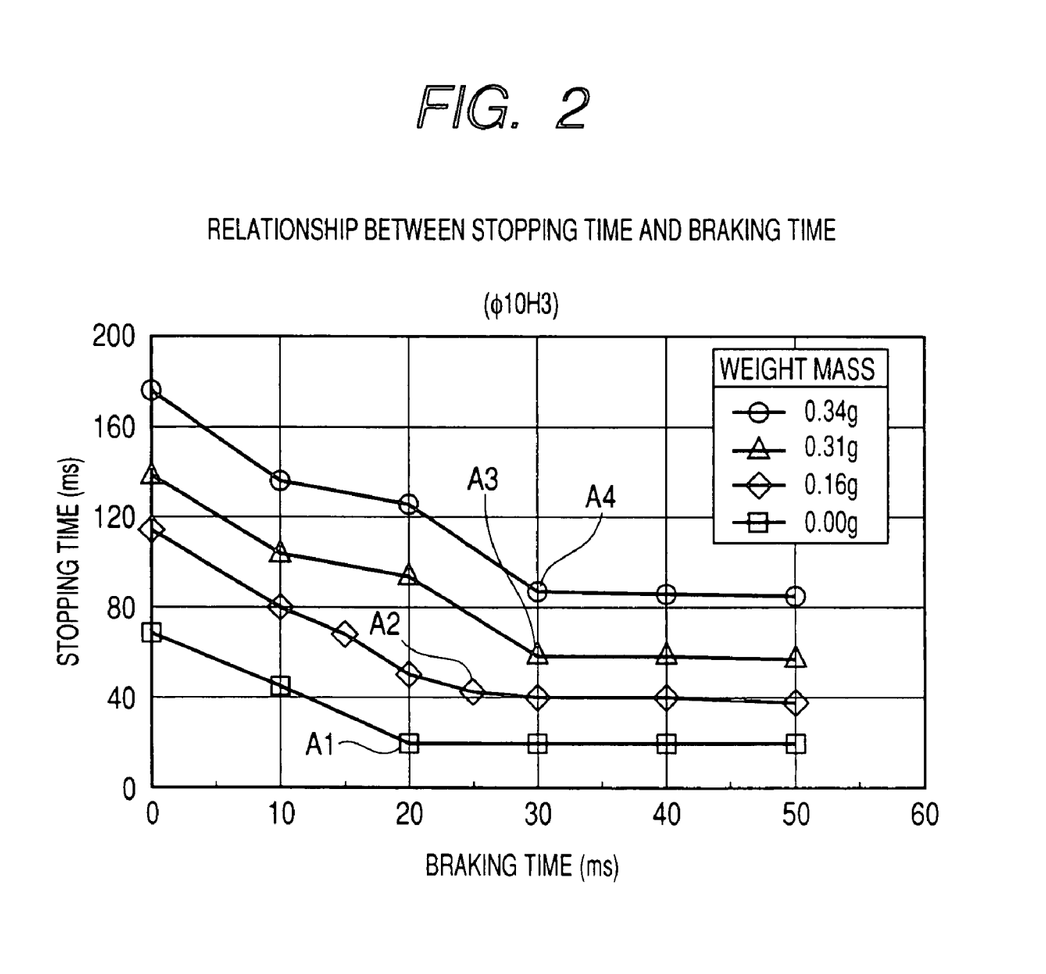
FIG. 2 is a graph of a relationship between braking time and stopping time in Table 1.

FIG. 2 shows a graph showing the relationship between stopping time and braking time in Table 1.

In FIG. 2, ○ represents a change in stopping time which resulted when braking time was changed in the stepping motor under the conditions described above with a weight of 0.34 g attached thereto.

Similarly, "△" represents a change which resulted when a weight mass of 0.31 g was attached. Similarly, "◇" represents a change which resulted when a weight mass of 0.16 g was attached. "□" represents a relationship between braking time and stopping time which resulted when no weight was attached, that is, the weight mass was 0 g.

In this description, the "braking time" means a time during which a braking state continues in which a supply of driving pulses is stopped, a driving voltage continues to be applied, and a direct current continues to flow to a coil.

From FIG. 2, an inclination BA from a stopping time resulting when no brake is applied, that is, braking time is 0 ms, to a point An (where, n is an integer) where a characteristic initiates in which although braking time increases, stopping time increases little, in other words, stopping time becomes substantially constant is as follows;

in a characteristic curve for the weight mass of 0 g, an inclination BA1 to a braking time at a point A1 is about 25°, in a characteristic curve for the weight mass of 0.16 g, an inclination BA2 to a braking time at a point A2 is about 26°, in a characteristic curve for the weight mass of 0.31 g, an inclination BA3 to a braking time at a point A3 is about 25°, and in a characteristic curve for the weight mass of 0.34 g, an inclination BA4 to a braking time at a point A4 is about 28°. The following tendency can be observed in the characteristic curves in FIG. 2.

(1) Although a slight variation is observed in the inclination BA, even though the value of the weight mass changes, the inclination is approximated to the characteristic curve of the weight mass of 0 g and then become substantially constant (the inclination is minute or none).

(2) The point An where the characteristic initiates in which the stopping time becomes substantially constant is as follows;

in the characteristic curve of the weight mass of 0 g, the point A1 is at 20 ms, in the characteristic curve of the weight mass of 0.16 g, the point A2 is at 25 ms, in the characteristic curve of the weight mass of 0.31 g, the point A3 is at 30 ms, and in the characteristic curve of the weight mass of 0.34 g, the point A4 is at 30 ms.

When connecting the point A1 of 20 ms on the characteristic curve for the weight mass of 0 g, the point A2 of 25 ms on the characteristic curve for the weight mass of 0.16 g and the point A3 of 30 ms on the characteristic curve for the weight mass of 0.31 g, a characteristic curve having an inclination of about +4 based on the axis of braking time results, and the point A3 of 30 ms on the characteristic curve for the weight mass of 0.31 g and the point A4 of 30 ms on the characteristic curve for the weight mass of 0.34 g forms a characteristic curve of the braking time of 30 ms.

In addition, from a different viewpoint, in the characteristic curve for the weight mass of 0.16 g, when the measuring point of braking time is set 0, 10, 20, 30(ms), . . . as in the case of the other characteristic curves, that the braking time at the point A2 where the stopping time becomes substantially constant can be considered not 25 ms but 30 ms, it can be considered that when the weight is attached (when the weight mass is 0.16 g or heavier), the braking time becomes even at 30 ms.

(Relationship Between Weight Mass and Time)

When reviewing Table 1 from the viewpoint of a relationship between weight mass and time, Table 2 results.

TABLE 2

| | Time (ms) | | |
|---|---|---|---|
| Weight mass (g) | Stopping time without brake applied | Stopping time with complete braking attained | Optimum braking time |
| 0.00 | 70 | 20 | 20 |
| 0.16 | 115 | 37 | 25 |
| 0.31 | 140 | 55 | 30 |
| 0.34 | 177 | 88 | 30 |

Figure 3:
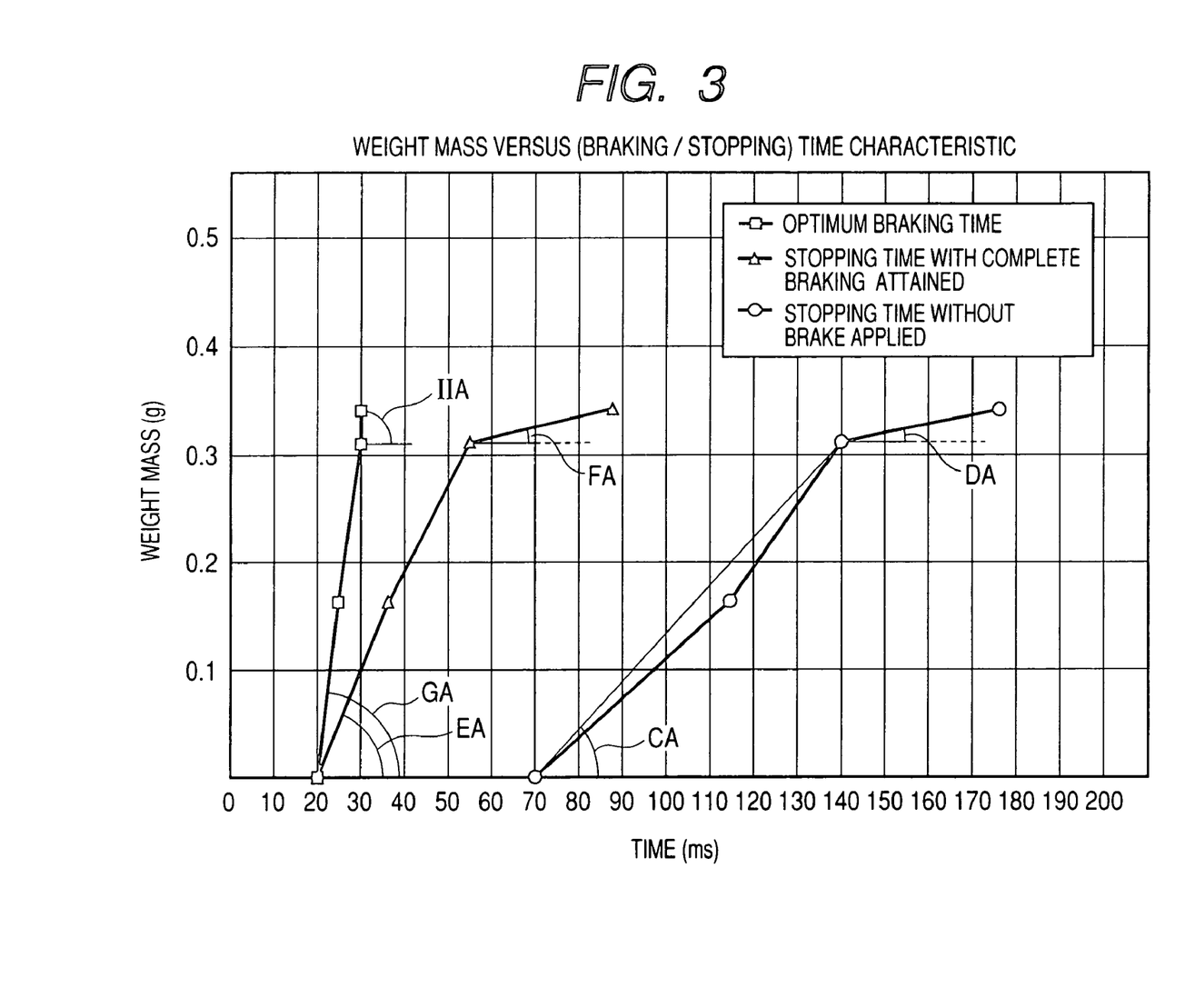
FIG. 3 is a graph showing a relationship between weight mass and time of the invention.

FIG. 3 is a graph showing a relationship between weight mass and time. Table 2 is shown in FIG. 3 in the form of a graph.

The following tendencies are observed in characteristics shown in FIG. 3.

(3) A stopping time characteristic when no brake is applied in FIG. 3 can be approximated by a straight line whose inclination CA is substantially +0.31/70=+0.0044 for weight masses of 0 g to 0.31 g and can be approximated by a straight line whose inclination DA is substantially +0.03/37=+0.0008 for weight masses of 0.31 g to 0.34 g.

From this fact, the stopping time when no brake is applied can be approximated by the straight line having the inclination CA in case the weight mass is smaller than 0.31 g as a boundary, and the stopping time can be dealt with relative to a fluctuation in weight within a small range.

On the other hand, in the example where the weight mass is 0.31 g or heavier, since the stopping time rides on the characteristic curve whose inclination DA is far less steep than the inclination CA, the stopping time changes largely even with a minute fluctuation in weight.

(4) A stopping time characteristic when a complete braking is attained shown in FIG. 3 can be approximated by a straight line whose inclination EA is substantially +0.31/35=+0.0088 for weight masses from 0 g to 0.31 g and can be approximated by a straight line whose inclination FA is substantially +0.03/33=+0.0009 for weight masses from 0.31 g to 0.34 g.

From this fact, the stopping time when a complete braking is attained can be approximated by the straight line having the inclination EA in case the weight mass is smaller than 0.31 g as a boundary, and the stopping time can be dealt with relative to a fluctuation in weight within a small range.

On the other hand, in the example where the weight mass is 0.31 g or heavier, since the stopping time rides on the characteristic curve whose inclination FA is far less steep than the inclination EA, the stopping time changes largely even with a minute fluctuation in weight.

(5) When comparing the stopping time characteristic when no brake is applied with the stopping time characteristic when a complete braking is attained, the inclination EA is steeper than the inclination CA. This means that a braking action attained by virtue of the supply of direct current to the coil is far more effective than a braking action attained by a permanent magnet provided in the rotor.

On the other hand, the inclination DA and the inclination FA differ little from each other. From this fact, when the weight mass exceeds 0.31 g, the stopping characteristic becomes almost the same between when no brake is applied and when a complete braking is attained.

(6) An optimum braking time characteristic in FIG. 3 can be approximated by a straight line whose inclination GA is substantially +0.31/10=+0.031 for weight masses from 0 g to 0.31 g and can be represented by a straight line which becomes inclined no more from a time point of 30 ms.

The "optimum braking time" means the duration of a braking state in which the supply of driving pulses is stopped and direct current is caused to continue to flow to the coil while the driving voltage continues to be applied, and after the braking state is cancelled, the rotor can slip to stop in the predetermined stabilizing position. The word "slip" means to rotate under inertia. The "complete braking" means that the braking condition continues until the rotor stops in which the supply of driving pulses is stopped and direct current is caused to continue to flow to the coil where the driving voltage continues to be applied.

Next, relationships of optimum braking time and the like which resulted when the weight mass was changed are shown by motor configuration in Table 3.

TABLE 3

| Motor configuration | φ10H3 | | φ12H2 | |
|---|---|---|---|---|
| Weight mass | 0.34 g | 0.31 g | 0.16 g | 0.26 g |
| (1) Stopping time without brake applied | 177 ms | 140 ms | 115 ms | 400 ms |
| (2) Stopping time with a complete braking attained | 88 ms | 55 ms | 37 ms | 155 ms |
| (3) Optimum braking time | 30 ms | 30 ms | 25 ms | 100 ms |
| (3)/(1) | 17% | 21% | 25% | 25% |

As is shown in Table 3, (optimum braking time)/(stopping time without brake applied) becomes as follows;

17%, when the weight mass is 0.34 g,
21%, when the weight mass is 0.31 g, and
25%, when the weight mass is 0.16 g.

In addition, although not shown in Table 3, (optimum braking time)/(stopping time without brake applied) becomes 28%, when the weight mass is 0 g. From these facts, it is indicated that (optimum braking time)/(stopping time without brake applied) tends to decrease gradually as the weight mass increases.

As is shown in FIG. 3, in the case of a motor having characteristics which resulted when a weight mass of 0.26 g was attached to a stepping motor having a motor configuration of a diameter (φ) of 12 mm and a height (H) of 2 mm, that is, characteristics providing a stopping time without brake applied of 40 ms, a stopping time with a complete brake attained of 155 ms and an optimum braking time of 100 ms, (optimum braking time)/(stopping time with no brakes applied) becomes 25%. From this data, when the diameter (φ) of the motor is increased from 10 mm to 12 mm or by about 20%, since the inertia is increased, the respective stopping times and the like become remarkably longer. However, since (optimum braking time)/(stopping time with no brakes applied) also becomes 25% and indicates a similar numeric value, it is considered that a similar tendency is indicated to a stepping motor having a diameter (φ) of 10 mm and a height (H) of 3 mm.

(Supply Voltage Control)

A control of switching the supply voltage from a high voltage to a low voltage can be applied to the stop control as part thereof. Specifically speaking, a 2-way power supply switching method is adopted.

Figure 4:
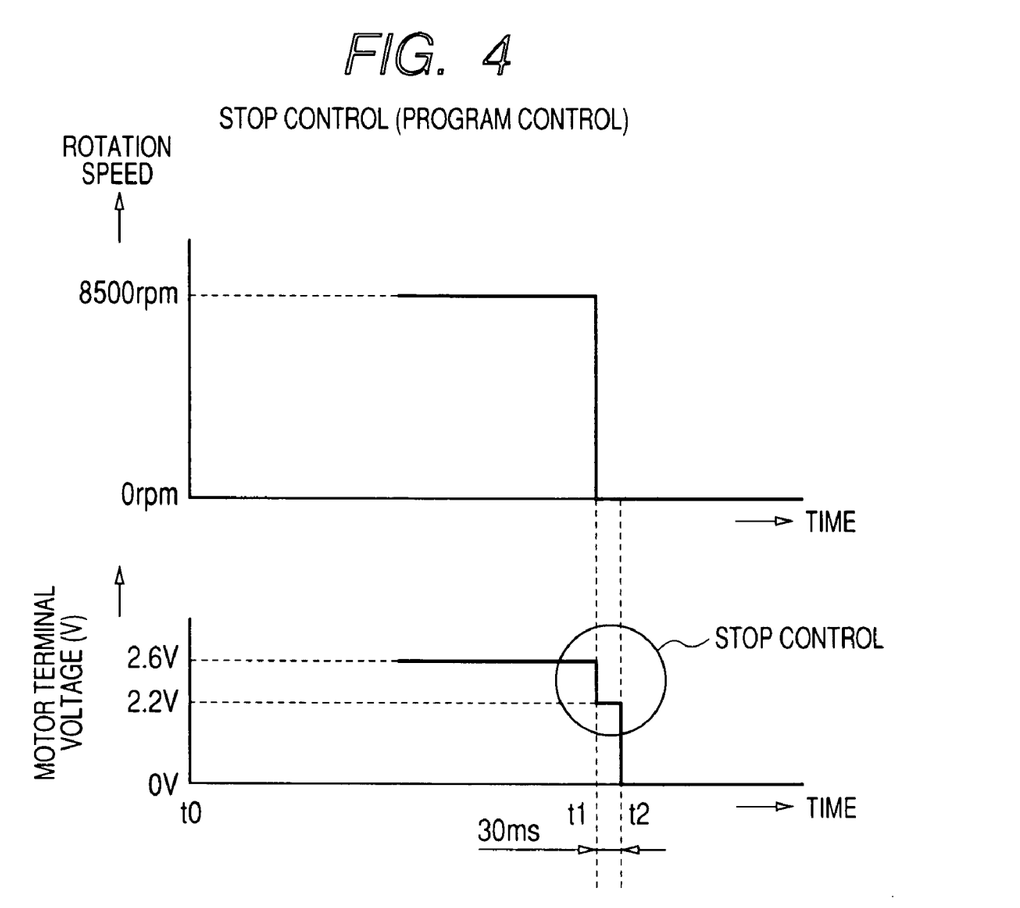
FIG. 4 is an explanatory diagram which explains a voltage switching control during a stop control of the invention.

FIG. 4 is an explanatory diagram which explains a voltage switching control during stop control of the invention. An upper part of FIG. 4 shows a time characteristic diagram of rotation speed, while a lower part of FIG. 4 shows a time characteristic diagram of voltage change.

When a stop control is executed in such a state that the stepping motor is rotating at a rotation speed of 8500 rpm, the supply voltage is decreased from 2.6V to 2.2V. At this time, the brake is applied with the voltage of 2.2V. At the same time, the apparent rotation speed drops to 0 (zero) rpm. The reason why the rotation speed is expressed as the apparent rotation speed is that although the brake is applied, the motor still continues to rotate by the action of inertia. However, a rotation speed which results then is such a low rotation speed as not to be depicted when compared with 8500 rpm. The supply voltage of 2.2V is cut off after the optimum braking time, in the case of this example, 30 ms, has elapsed, whereby the supply voltage is dropped to 0 (zero) V. The application of brake is cancelled after the brake has been applied during this optimum braking time, and thereafter, the motor continues to rotate under inertia for a short period of time and then stops of itself in the stabilizing position.

While the supply voltage is controlled to decrease from the high voltage to the low voltage at the same time as the supply of driving pulses is stopped during stop control, this is performed to prevent the occurrence of an abnormal state due to the current value being increased since there occurs no switching in directions of current flowing to the coil when the supply of driving pulses is stopped. For example, the driving voltage is decreased in such a way that the value of the current that is supplied to the coil of the motor is decreased to or below the value of a permissible current, when the supply of driving pulses is stopped. In the event that there is present a setting where the aforesaid abnormal state is not produced, the 2-stage switching control of power supply is not necessary.

From this fact, the necessity of the 2-stage switching control of power supply is obviated in the normal condition where the occurrence of abnormal state does not have to be taken into consideration. However, in a condition where the occurrence of abnormal state has to be taken into consideration, a control results in which the 2-stage switching control of power supply is carried out.

Embodiment 1

Since a one-phase (single-phase) stepping motor which constitutes an object to be controlled by a stepping motor stopping control apparatus of the invention has a special configuration, the configuration will be described here.

Figure 5A:
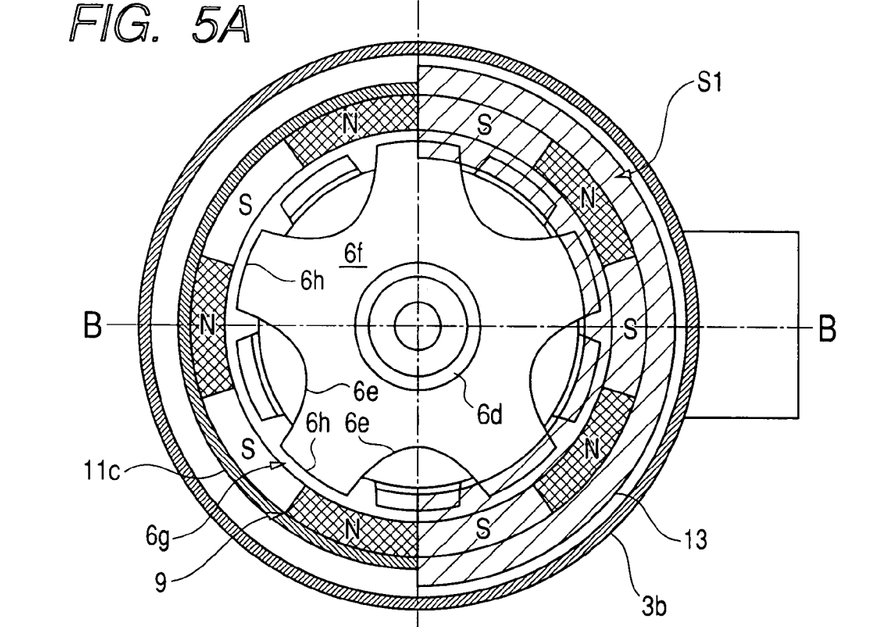
FIGS. 5(a) to 5(c) are configuration diagrams of a one-phase (single phase) vibration generating stepping motor.
Figures 5B, 5C:
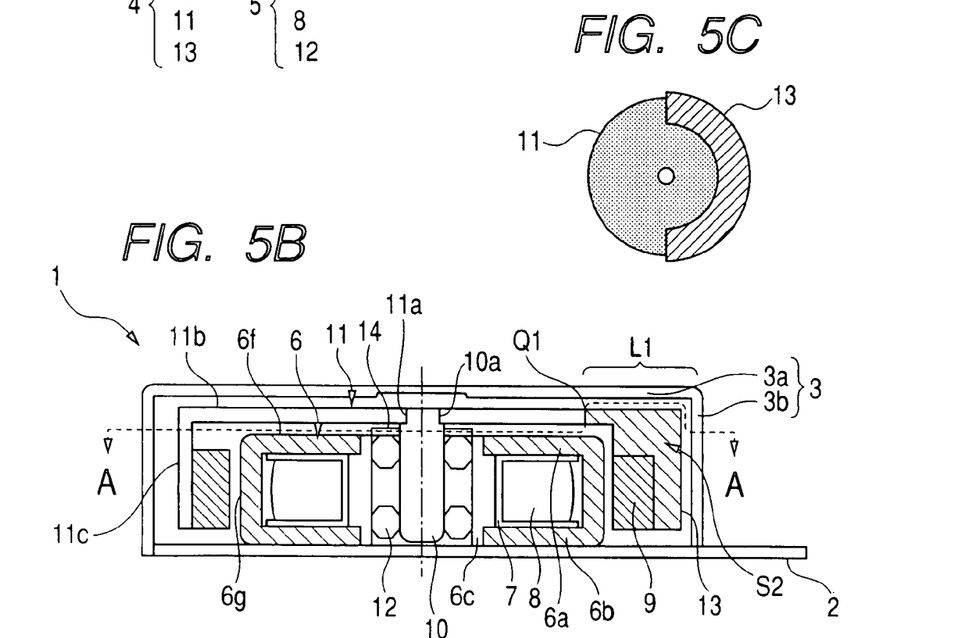

FIGS. 5(a) to 5(c) show configuration diagrams of a one-phase vibration generating stepping motor.

The one-phase vibration generating stepping motor shown in FIGS. 5(a) to 5(c) becomes the object to be controlled by the stepping motor stopping control apparatus of the invention.

FIG. 5(a) is a cross-sectional view taken along line A-A in FIG. 5(b), FIG. 5(b) is a sectional view taken along line B-B in FIG. 5(a), and FIG. 5(c) is a plan view of a rotor frame.

An outer rotor type vibration generating stepping motor 1 is comprised of an interface board 2, a cover 3, a rotor 4 and a stator 5.

The interface board 2 is configured by providing on a metal sheet an insulating layer, on which necessary wirings (such as a feeding line to a coil) and openings (illustration thereof being omitted) into which projecting portions (illustration thereof being omitted) of the cover 3 are fitted are formed. A second stator yoke 6b, which lies on the interface board 2 side of a stator yoke 6, and a center yoke 6c, which constitutes a third stator yoke, are fixed to the interface board 2 via the insulating layer, and projecting portions (illustration thereof being omitted) on an end faced of a cylindrical portion 3b of the cover are fitting in the openings and are then soldered from a rear side of the interface board 2. An external control circuit, a power supply and the like are connected to the wirings.

The stator 5 is comprised of a coil 8 wound around a coil bobbin 7 and the stator yoke 6 which is comprised of a first stator yoke 6a, the second stator yoke 6b and the center yoke 6c which constitutes the third stator yoke.

The stator yoke 6 is comprised of a magnetic material and is comprised of the first stator yoke 6a and the second stator yoke 6b, which each has pole teeth, and the center yoke 6c as the third stator yoke which supports the first stator yoke 6a and the second stator yoke 6b and forms a magnetic path together with them. In Embodiment 1, lengths of the pole teeth in a rotational direction are all formed same.

As their plan view are shown in FIG. 5(a), the first stator yoke 6a and the second stator yoke 6b are each formed into a cup shape as a whole in which an opening 6d and cut-outs 6e are provided. Specifically, the opening 6d is provided in a center of the cup shape in which a cylindrical portion 6g is continuously provided on the circumference of a disc portion 6f, and five substantially U-shaped cut-outs 6e each having an opening at an open end thereof are formed at equal intervals from the cylindrical portion 6g to the disc portion 6f of the cup shape, portions remaining between the substantially U-shaped cut-outs 6e being configured as pole teeth 6h. The open ends of the substantially U-shaped cut-outs 6e are aligned with free ends of the cup-shaped cylindrical portion 6g. The shape of the substantially U-shaped cut-outs 6e is determined as a result of the pole teeth 6h being formed properly.

The first stator yoke 6a and the second stator yoke 6b, which are formed in the way described above, are arranged vertically in such a manner that the pole teeth 6h of the respective stator yokes mesh with each other in a comb teeth fashion. The coil bobbin 7 which accommodates therein the coil 8 is provided between the first stator yoke 6a and the second stator yoke 6b. The stator yoke 6, which is comprised of the first stator yoke 6a, the second stator yoke 6b and the center yoke 6c, is disposed in such a manner as to cover the circumference of the annular coil 8.

The stator 5 is comprised of the annular coil 8 and the stator yoke 6 which grips the annular coil 8 in such a state that the pole teeth 6h are caused to mesh with each other in the comb teeth fashion, and a ring magnet 9 of the rotor 4, which will be described later on, is disposed in such a manner as to face the pole teeth 6h which lie on a radially outer side of the stator yoke 6.

The rotor 4 is comprised of a shaft 10, the ring magnet 9 and a rotor frame 11.

The shaft 10 has a projecting portion 10a having a reduced diameter and is inserted and supported in a bearing 12 within the center yoke 6c.

The rotor frame 11 is configured substantially into a cup shape which is comprised of a disc portion 11b having an opening 11a in a center thereof and a cylindrical portion which is provided continuously on the circumference of the disc portion 11b.

As is shown in FIG. 5(c), the rotor frame 11 has a weight portion 13 provided integrally on part thereof. The rotor frame 11 is formed, for example, of a metal material such as iron.

The rotor frame 11 is fixedly fitted on the reduced diameter projecting portion 10a of the shaft 10 at the opening 11a thereof. At this time, the rotor frame 11 is provided in such a manner as to be spaced apart from the first stator yoke 6a. In addition, a portion of the rotor frame 11 which lies in the vicinity of a mounting base portion where the rotor frame 11 is mounted on the shaft 10 is supported by a washer 14 which is stacked on the bearing 12.

The ring magnet 9 is provided on an internal surface of the cylindrical portion 11c of the rotor frame 11. The ring magnet 9 has five pairs of magnetic poles of N poles and S poles which are provided continuously in a ring-like fashion.

The weight portion 13 is made up of a metal material which has a high specific gravity and magnetic properties and occupies a three-dimensional space defined by a partially ring-shaped region S1 of an angular range shown in the plan view of FIG. 5(a) and a sectional area S2 shown in the sectional view of FIG. 5(b). The partially ring-shaped region S1 denotes a partial region from a position on an outer circumference of the disc portion 11b of the rotor frame 11 to a position which lies radially inwards by a width L1 (in FIG. 5(b), a width from the position on the outer circumference of the disc portion which lies further radially inwards than a radially inward end of the weight portion 13 from the position on the outer circumference of the disc portion. A center angle of this weight portion 13 is obtained based on a specific gravity of a material used in relation to a design thereof, and in the case of Embodiment 1, the center angle is in the range of 120° to 200°. Preferably, the center angle is set at 180°.

When considering that the rotor frame 11 is comprised of the disc portion 11b having a uniform thickness and the cylindrical portion 11c, the weight portion 13 substantially includes the rotor frame 11 and additionally has a portion which protrudes inwards, and is welded to the rotor frame 11.

The weight portion 13 is provided on part of the rotor frame 11 in such a manner that the center of gravity of the rotor frame 11 lies eccentric relative to the center of the frame 11.

The weight portion 13 can be taken an arbitrary shape, provided that the shape can substantially complement a lack of the shape of the rotor frame 11 which is comprised of the disk portion 11b having a uniform thickness and the cylindrical portion 11c and support the ring magnet 9.

The ring magnet 9 is formed from an arbitrary material including, for example, neodymium (Nd), iron (Fe), born (B), samarium (Sm), cobalt (Co) and the like, is configured into a ring magnet which has a shape formed by providing continuously a plurality of pairs of magnets of N pole and S pole in a ring-like fashion, and is provided inside the rotor frame 11 which includes the weight portion 13.

The ring magnet 9 can be made up of at least one magnet. In the case of the ring magnet 9 being made up of one magnet, the ring magnet 9 is magnetized in such a way as to have a plurality of magnetic poles. However, a form is also included in the concept of the "ring magnet made up of one magnet" in which 10 magnets which make up a plurality of pairs of magnets, each pair being magnetized to NS or SN in a radial direction from an axis center, are integrated into one piece by providing the magnets continuously into a ring shape in such a manner that different magnetic poles are arranged alternately along an inner circumferential surface thereof.

The ring magnet 9 is secured to the rotor frame 11 and the weight portion 13 by means of an adhesive.

In Embodiment 1, lengths in the rotational direction of all the magnetic poles of N pole or S pole making up the ring magnet 9 (the length of an arc) are formed same.

The cover 3 is made of a non-magnetic metal material, for example, SUS (stainless steel) 303, has a U-shaped section and is formed into a cup shape as a whole which is comprised of a disc portion 3a and a cylindrical portion 3b which is provided on the circumference of the disc portion in such a manner as to erect at right angles thereto.

Figure 6:
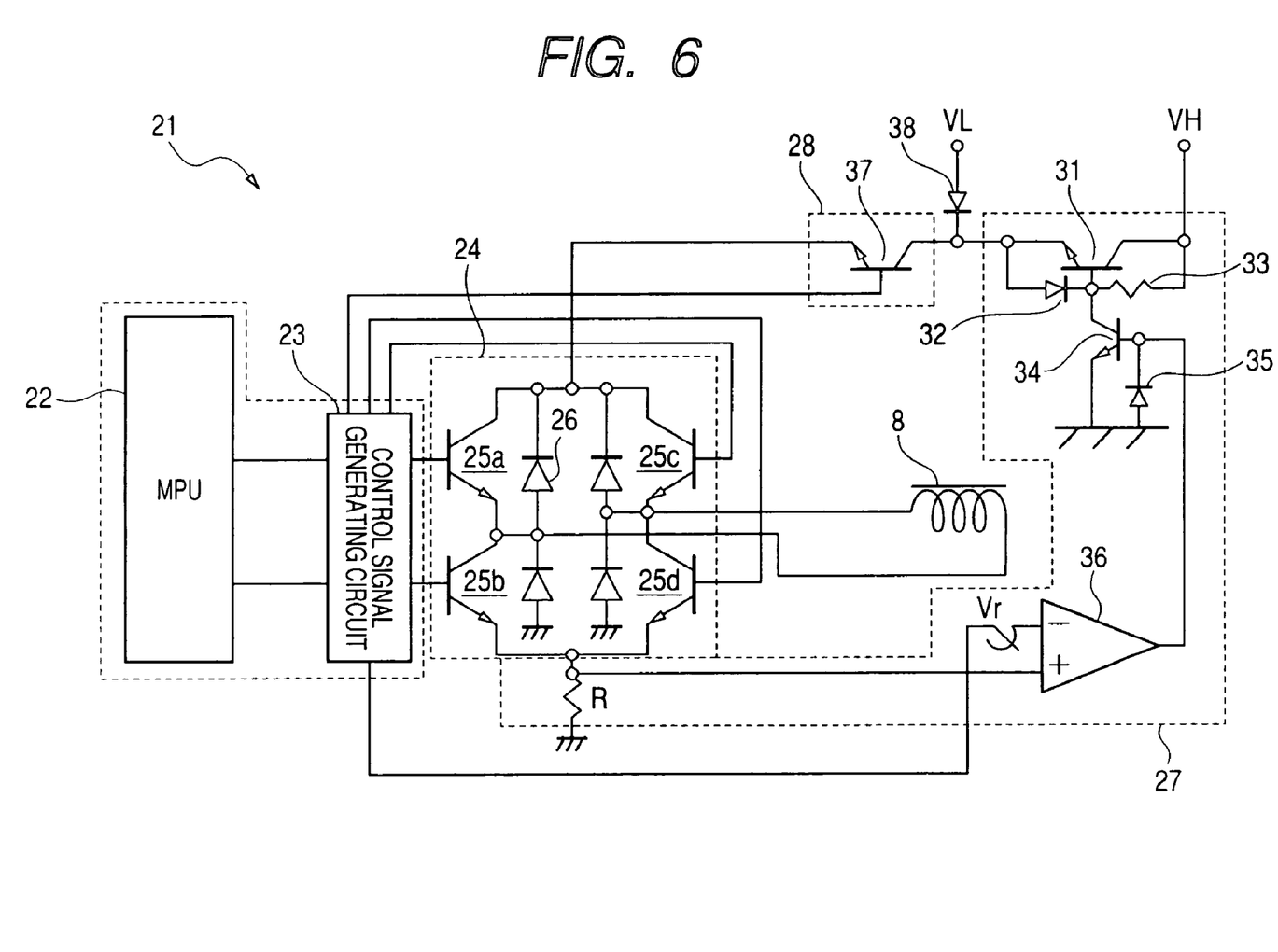
FIG. 6 is a circuit diagram of a control unit for controlling stopping of the vibration generating stepping motor of the invention.

FIG. 6 is a circuit diagram of the control unit for controlling the stopping of the vibration generating stepping motor of the invention. FIG. 6 shows an example of a constant-current chopper drive circuit of 2-power supply switching type.

A control unit 21 for controlling the stopping of the vibration generating stepping motor shown in FIG. 6 shows an MPU (microprocessor) 22 and a drive circuit for the stepping motor. The MPU 22 and the drive circuit are installed in an IC chip. The drive circuit is comprised of a control signal generating circuit 23, a switching circuit 24, a current chopper circuit 27, and a power supply cut-off circuit 28. The drive circuit is connected to a high-voltage power supply VH and a low-voltage power supply VL. The MPU 22 and the control signal generating circuit 23 are combined together to be referred as a control circuit 30.

The high-voltage power supply VH is connected in such a way as to cut off a feeding path to the coil 8 by a transistor 31 of the current chopper circuit 27. The low-voltage power supply VL is connected to the feeding path via a diode 38 so as to be effective when the high-voltage power supply VH is cut off from the feeding path. When cutting off both the power supplies, a transistor 37 of the power supply cut-off circuit 28 is caused to be OFF.

The control signal generating circuit 23 creates various signals based on control instructions from the MPU 22 and outputs them to devices which constitute objects to be controlled.

Specifically, the control signal generating circuit 23

(1) outputs gate signals (driving pulses) at timings to respective power transistors 25a to 25d of the switching circuit 24 to apply driving pulses to the coil 8 of single-phase bi-polar system, (2) outputs a signal to forcibly change a reference voltage of the current chopper circuit 27 to a low voltage or zero volt in such a way as to match a timing to OFF (stop) the output of driving pulses in order to switch the power supply that is applied to the coil 8 to the low-voltage power supply VL by making a transistor 34 of the current chopper circuit 27 normally ON and making the transistor 31 thereof normally OFF, (3) outputs a signal to set a reference voltage Vr of a comparator 36 to a voltage which corresponds to a constant current value which can generate a desired torque when the power supply applied to the coil 8 is the high-voltage power supply VH in order to make the current flowing to the coil 8 a current of a constant value, and (4) outputs an OFF signal to the transistor 37 of the power supply cut-off circuit 28 to drop the voltage of the power supply applied to the coil 8 to zero volt.

Arbitrary transistors may be used as transistors and switching devices to be used, provided that they are power transistors such as MOSFET having a large current capacity. The reference voltage Vr is to take a form in which a voltage value changes according to an external signal.

In the switching circuit 24, the coil 8 corresponding to one phase of the motor is connected to each of pairs of respective series circuits of the power transistors 25a and 25b and 25c and 25d and series circuits of two clamping diodes 26 in a bi-polar coil fashion. The coil 8 makes up the coil of the one-phase stepping motor shown in FIG. 1.

The current chopper circuit 27 detects the current flowing to the coil 8 as a voltage by a resistor R when the power supply applied to the coil is the high-voltage power supply VH, compares the voltage so detected with the reference voltage Vr at the comparator 36, controls a base potential of the transistor 34 which is clamped by the clamping diode 35 by a deviation that results from the comparison, switches the high-voltage power supply VH to the switching circuit 24 for supply thereto and makes the current flowing to the coil 8 a current of a constant value. At this time, the reference voltage Vr of the comparator 36 is set to a voltage which corresponds to a constant current value which can generate a desired torque. The power transistors 25a, 25b, 25c and 25d are gate controlled by control signals from the MPU 22 via the control signal generating circuit 23. The MPU 22 controls the reference voltage Vr of the comparator 36 and makes and breaks a connection to the feeding path of the high-voltage power supply VH by switching ON and OFF the transistor 31.

In addition, when receiving the signal to forcibly change the reference voltage Vr of the current chopper circuit 27 to the low voltage or zero volt in such a manner as to match the timing to OFF (stop) the supply of driving pulses from the control signal generating circuit 23, the current chopper circuit 27 switches the power supply applied to the coil 8 to the low-voltage power supply VL by making the transistor 34 normally ON and making the transistor 31 normally OFF.

The power supply cut-off circuit 28 receives an OFF signal from the control signal generating circuit 23 at the transistor 37 thereof and drops the voltage of the power supply applied to the coil 8 to zero volt.

The MPU 22 causes the transistor 31 to operate as a chopper via the control generating circuit 23 according to a program such as a stop control program, a drive control program, and a constant current control program and the like and performs, for example, a PWM (pulse width modulation) control. The constant current control is preferred to increase a torque to be generated.

A brake control at the time of stopping the motor, which will be described below, is executed according to a program installed in the MPU 22.

(Brake Control at the Time of Stopping the Motor)

In a stop control of the invention, a procedure of a brake control for stopping the motor becomes crucial. The stop control takes a form in which brake is applied to a predetermined timing in consideration of a slippage (rotation under inertia) of the rotor after the application of brake is cancelled, and the rotor is allowed to rotate under inertia after the release of brake to stop in a predetermined stabilizing position. When the stop control is performed, although a control to drop the supply voltage from the high voltage to the low voltage is performed at the same time as the supply of driving pulses is stopped, this is performed to prevent the occurrence of an overcurrent state which is caused by an increase in the current value due to there occurring no switching of the direction of the current flowing to the coil when the supply of driving pulses thereto is stopped. Namely, when the supply of driving pulses is stopped, the driving voltage is decreased in such a manner that the value of the current supplied to the coil of the motor is decreased to or below the value of a permissible current. In the event that there is present a setting where the overcurrent state is not produced, a 2-stage switching control of power supply is not necessary.

From this fact, the 2-stage switching control of power supply is not necessary in the normal condition where the generation of an overcurrent state does not have to be taken into consideration. However, in such a condition that the generation of an overcurrent state has to be taken into consideration, the control has to results in which the 2-stage switching control of power supply is performed.

Figure 7A:
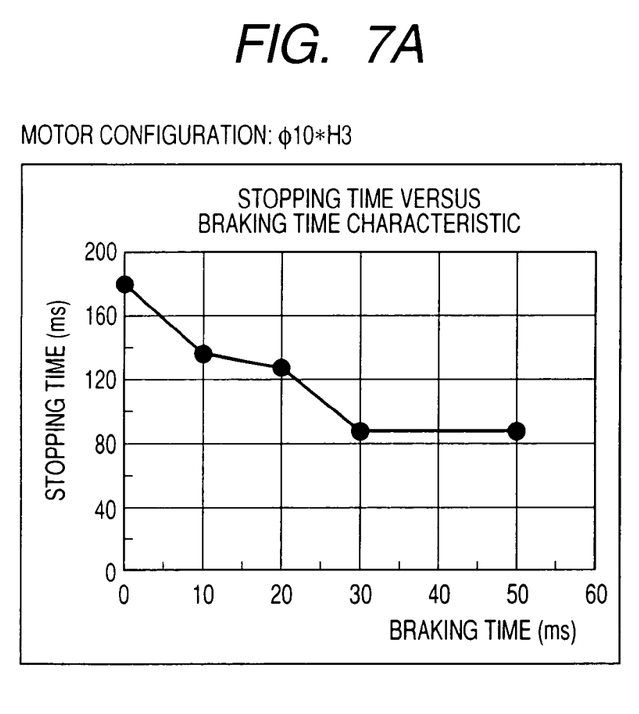
FIGS. 7(a) and 7(b) are explanatory diagrams of a stopping time control of a stepping motor stopping control unit for one type of motor of the invention.
Figure 7B:
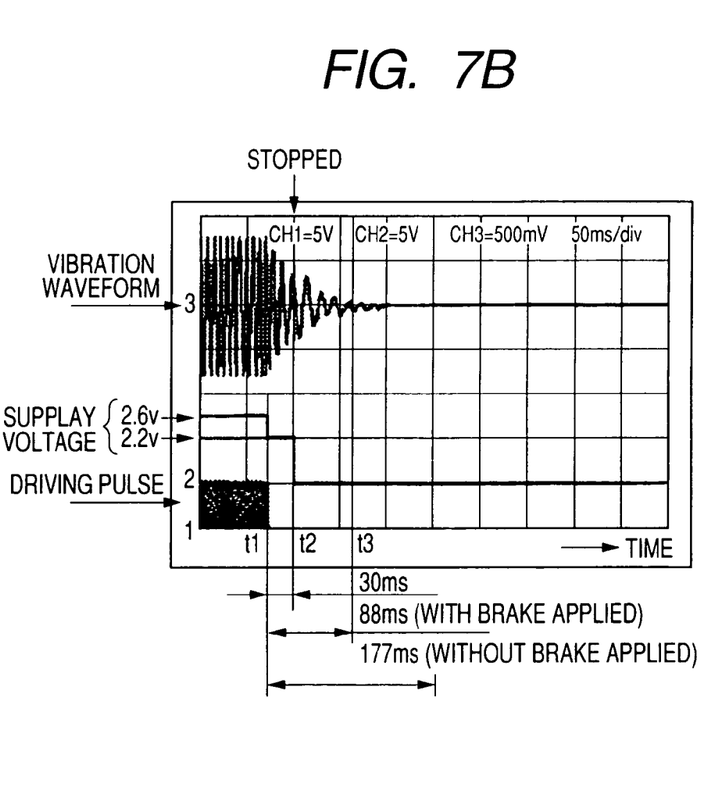

Hereinafter, the disclosure of the procedure is prioritized, and a stop control will be described in which the 2-stage switching control of power supply is performed. Consequently, in the event that the 2-stage switching control of power supply is unnecessary, a flow of steps will result in which the relevant procedure is deleted.

FIGS. 7(a) and 7(b) show explanatory diagrams of a stopping time control in a control unit for controlling the stopping of another type of stepping motor of the invention. FIG. 7(a) is a stopping time versus braking time characteristic diagram, and FIG. 7(b) is an explanatory diagram showing the elapse of time in a control operation.

FIGS. 7(a) and 7(b) are the diagrams showing signal characteristics of a brake control at the time of stopping the motor when a weight mass of 0.34 g was attached, as a weight, to a stepping motor of a motor configuration having a diameter (φ) of 10 mm, a height (H) of 3 mm and a rotation speed of 8500 rpm.

An optimum braking time of 30 ms is stored in advance in a register according to a motor configuration of the example shown in FIGS. 7(a) and 7(b).

At the time of a normal rotation, a driving pulse matching the rotation speed is supplied to the power transistor of the switching circuit by the MPU 22 in such a state that a drive voltage (in the case of Embodiment 1, 2.6V) of high voltage for high-speed rotation is supplied to the coil of the motor, so as to drive to rotate the weight in such a manner as to generate a frequency having a vibration waveform shown in the figure.

From this state, the MPU 22 executes the procedure (steps) of a stop control mode according to the program. The control signal generating circuit 23 outputs necessary signals to the respective switching devices and the like based on instructions outputted from the MPU 22 in association with the execution of the procedure of the stop control mode.

Figure 1:
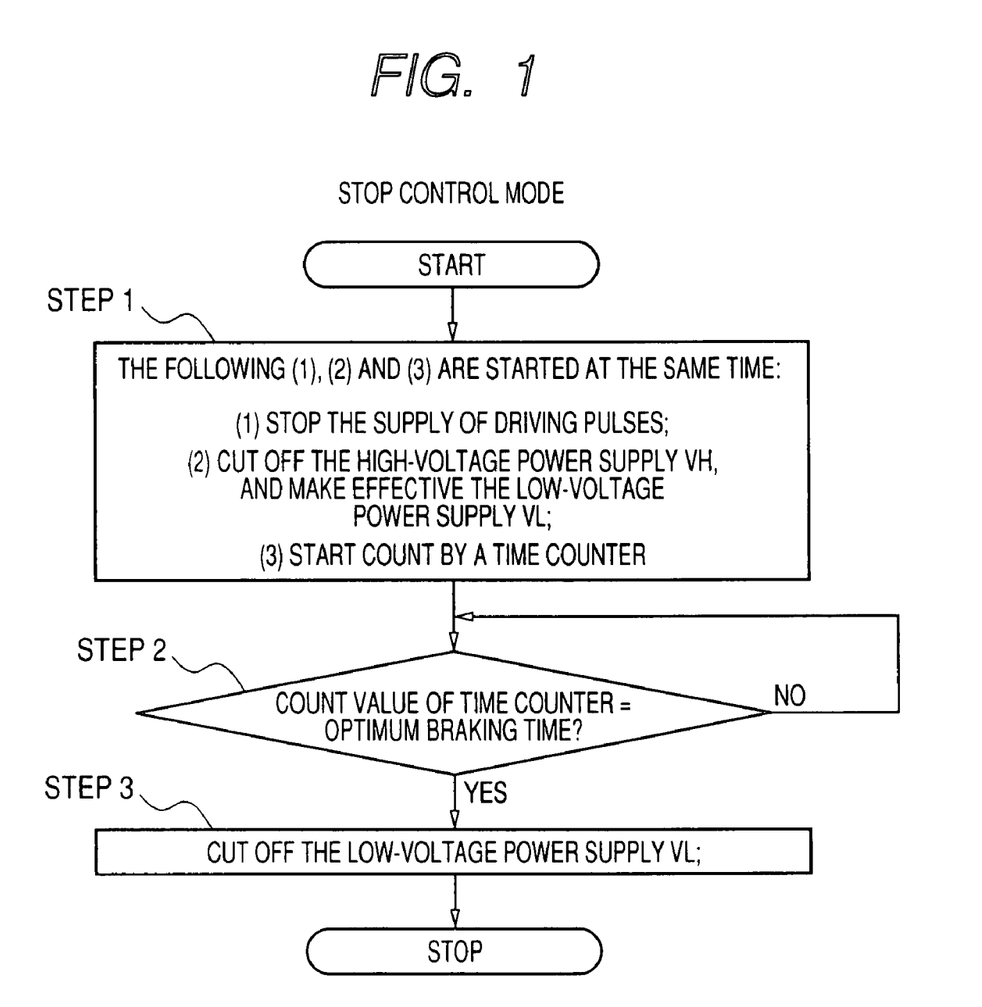
FIG. 1 is an explanatory diagram showing a flow of a stop control mode of a method and apparatus for controlling stopping of a vibration generating stepping motor of the invention.

The procedure of the stop control mode will be described as follows. FIG. 1 is a flowchart of the stop control mode of the invention.

Stop Control Mode:

An optimum braking time for a motor configuration which matches that of the relevant motor is set in advance in the register of the MPU 22. The MPU 22 outputs a series of instructions to the control signal generating circuit while following the following flow. The control signal generating circuit, which lies at a subsequent stage, creates necessary signals based on the series of instructions and outputs them to the respective control objects so as to cause them to execute necessary operations.

1. Start:
2. Step 1:

The following (1), (2) and (3) are started at the same time.
(1) The supply of driving pulses is stopped at a timing t1 in FIG. 7(b).
(2) The high-voltage power supply VH as the drive power supply is cut off, and the low-voltage power supply VL is made effective.

[In the case of Embodiment 1, the transistor 31 of the current chopper circuit 27 is switched OFF, so as to make the low-voltage power supply VL effective. As a result, the supply voltage is decreased from 2.6V to 2.2V. This results from the following reason. Namely, since the current flowing to the coil loses the rising characteristic which resulted when switched by the supply of driving pulses being stopped, whereby the current is allowed to flow at all times, the current value increases. Since this current value needs to be suppressed to or below the value of the permissible current and the value of a current required for holding the position of the rotor may be small, the drive voltage is decreased, so as to decrease the power consumption. At this time, brakes are applied by the current flowing to the coil.]

(3) Count by a time counter (illustration thereof being omitted) is started.

3. Step 2:

Make a comparison to see whether or not count value of the time counter=optimum braking time is attained, and when count value of the time counter=optimum braking time is attained, proceed to the following step 3. When count value of the time counter=optimum braking time is not attained, execute step 2 in succession.

4. Step 3:

The low-voltage power supply VL is cut off.

[The drive voltage is dropped to 0 (zero) V at a timing t2 which results when the optimum braking time of 30 ms has elapsed from t1 in FIG. 7. (In the case of Embodiment 1, 2.2 V→0V.) This results in canceling of brake. At this time, as is observed in the vibration waveform, the damping of vibrations is in the midst thereof. Because of this, the rotor rotates under inertia and stops in the stabilizing position of itself. A timing t3 of stop means a point in time where although slight vibrations remain, vibrations are damped to such an extent that the rotor is allowed to return to the stabilizing position. A time interval from the timing t1 to the timing t3 is 88 ms, which is a stopping time when a complete braking is attained.

5. Stop:

In a section where the stopping time changes little even though the optimum braking time is changed, it is considered that the braking force is not working so effectively as expected relative to the rotational moment of the weight, and it is considered that vibrations tend to be damped extremely easily when the power supply is cut off due to the weight being the eccentric weight. Since the rotor stops in the stabilizing position, the rotor can be actuated smoothly.

According to the control described above, although as the braking time from the timing t1 when the pulses are stopped is made longer, the stopping time is made shorter, the stopping time reaches saturation at about 30 ms. As a result, the application of brake becomes unnecessary until a complete stop due to the desired stopping control operation being performed.

Embodiment 2

Figure 8A:
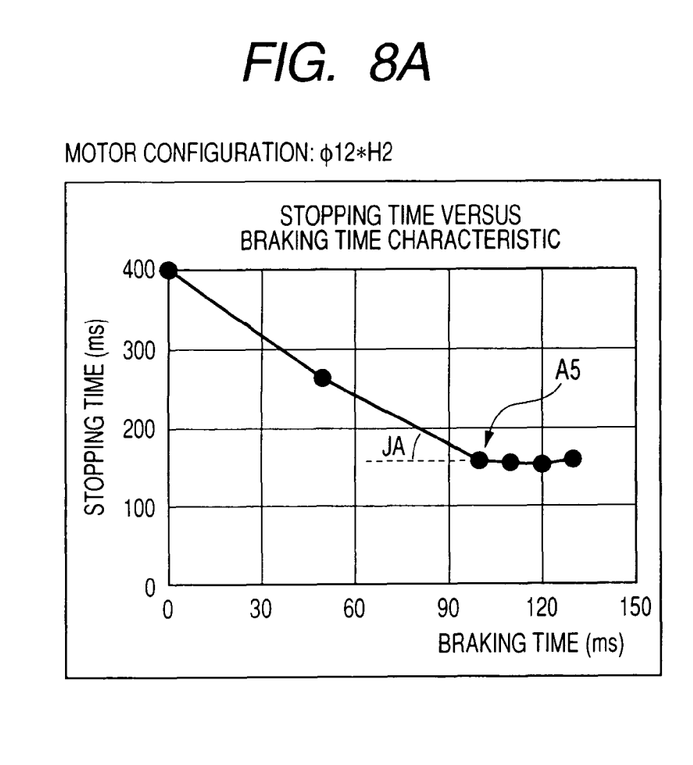
Figure 8B:
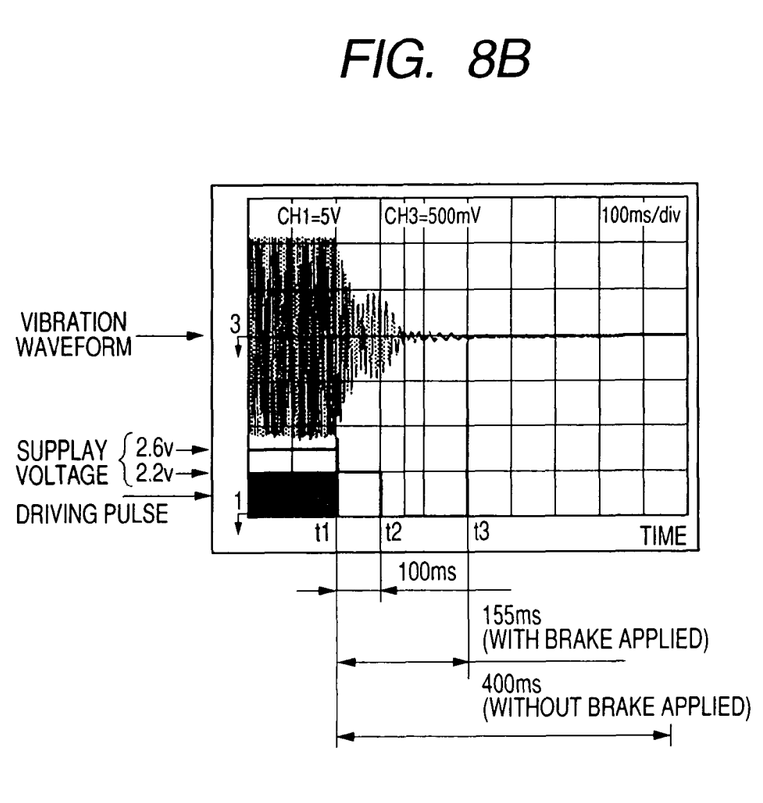

FIGS. 8(a) and 8(b) show explanatory diagrams of a stopping time control in a control unit for controlling the stopping of another type of stepping motor of the invention. FIG. 8(b) is an explanatory diagram showing the elapse of time in a control operation, and FIG. 8(a) is a stopping time versus braking time characteristic diagram.

FIGS. 8(a) and 8(b) are the diagrams showing signal characteristics of a brake control at the time of stopping the motor when a weight mass of 0.26 g was attached, as a weight, to a stepping motor of a motor configuration having a diameter (φ) of 12 mm, a height (H) of 2 mm and a rotation speed of 9500 rpm.

An optimum braking time of 100 ms is stored in advance in a register according to a motor configuration of the example shown in FIGS. 8(a) and 8(b).

At the time of a normal rotation, a driving pulse matching the rotation speed is supplied to the power transistor of the switching circuit by the MPU 22 in such a state that a drive voltage (in the case of Embodiment 1, 2.6V) of high voltage for high-speed rotation is supplied to the coil of the motor, so as to drive to rotate the weight in such a manner as to generate a frequency having a vibration waveform shown in the figure.

From this state, the MPU 22 issues an instruction to execute a brake control for stopping according to a program. Accompanying the instruction, procedures in the stop control mode as described below are executed through the control circuit.

Stop Control Mode:

An optimum braking time of 100 ms for a motor configuration which matches that of the relevant motor is set in advance in the register of the MPU 22.

The MPU 22 outputs a series of instructions to the control signal generating circuit while following the following flow. The control signal generating circuit, which lies at a subsequent stage, creates necessary signals based on the series of instructions and outputs them to the respective control objects so as to cause them to execute necessary operations.

1. Start:
2. Step 1:

The following (1), (2) and (3) are started at the same time.
(1) The supply of driving pulses is stopped at a timing t1 in FIG. 8(b).
(2) The high-voltage power supply VH as the drive power supply is cut off, and the low-voltage power supply VL is made effective.

[In the case of Embodiment 2, the transistor 31 of the current chopper circuit 27 is switched OFF, so as to make the low-voltage power supply VL effective. As a result, the supply voltage is decreased from 2.6V to 2.2V. This results from the following reason which is similar to that of Embodiment 1. Namely, since the current flowing to the coil loses the rising characteristic which resulted when switched by the supply of driving pulses being stopped, whereby the current is allowed to flow at all times, the current value increases. Since this current value needs to be suppressed to or below the value of the permissible current and the value of a current required for holding the position of the rotor may be small, the drive voltage is decreased, so as to decrease the power consumption. Brakes are applied by the current flowing to the coil.]

(3) Count by a time counter (illustration thereof being omitted) is started.

3. Step 2:

Make a comparison to see whether or not count value of the time counter=optimum braking time is attained, and when count value of the time counter=optimum braking time is attained, proceed to the following step 3. When count value of the time counter=optimum braking time is not attained, execute step 2 in succession.

4. Step 3:

The low-voltage power supply VL is cut off.

[The drive voltage is dropped to 0 (zero) V at a timing t2 which results when the optimum braking time of 100 ms has elapsed from the timing t1 in FIG. 8(b). At this time, as is observed in the vibration waveform, the damping of vibrations is in the midst thereof. Because of this, the rotor rotates under inertia and stops in the stabilizing position of itself. A timing t3 of stop means a point in time where although slight vibrations remain, vibrations are damped to such an extent that the rotor is allowed to return to the stabilizing position. A time interval from the timing t1 to the timing t3 is 155 ms, which is a stopping time when a complete braking is attained.

5. Stop:

FIG. 8(a) represents as a characteristic curve what resulted when obtaining stopping times by changing the optimum braking time (t2−t1) to six different values (0 ms, 50 ms, 100 ms, 110 ms, 120 ms, 130 ms) in the explanatory diagram in FIG. 8(b). The characteristics of FIG. 8(a) will be described as shown in Table 4 below.

TABLE 4

| Braking time (ms) | Stopping time (ms) |
| --- | --- |
| 0 | 400 |
| 50 | 265 |
| 100 | 155 |
| 110 | 155 |
| 120 | 155 |
| 130 | 160 |

From FIG. 8(a), an inclination JA from a state where no brakes are applied or a stopping time where the braking time is 0 ms to a braking time at a point A5 where a characteristic in which although braking time increases, stopping time increases little, in other words, the stopping time becomes substantially constant is −(400−155)/100=−245/100=−2.45, in other words, −68°.

From this data, even with the motor configuration (φ12*H2) which differs from the motor configuration (φ10*H3), the similar stopping time versus braking time characteristic to that of the motor configuration (φ10*H3) is shown.

Summary of Embodiments 1 and 2

From the results of the study that has been made heretofore, irrespective of the motor configuration, (1) an inclination from the state where no brake is applied, that is, the stopping time where the braking time is 0 ms, to the braking time at the point An where the characteristic in which although braking time increases, stopping time increases little, in other words, the stopping time becomes substantially constant becomes substantially constant. In addition, (2) there also exists the braking time where although the braking time after the point An increases, the stopping time fluctuates little.

Consequently, in the event that the application of brakes is cancelled at the point An, so as to allow the motor to rotate under inertia, since the rotation speed has been dropped to a rotation speed which facilitates the stopping of the motor at that point in time, the motor can stop in the stabilizing position with good balance.

In the embodiments that have been described heretofore, modifications can be made to the components, as long as their functions are not changed.

This application is based on the Japanese Patent Application (No. 2005-377847) filed on Dec. 28, 2005, the contents of which are incorporated herein by reference.

INDUSTRIAL APPLICABILITY

The method and apparatus for controlling the stopping of a stepping motor of the invention can be applied to a vibration generating stepping motor for mobile phones and the like and which can attain an accurate stopping position of the motor and reduce power consumption for the stopping operation.

The invention claimed is:

1. A method for controlling stopping of a vibration generating stepping motor by a control apparatus, the method comprises:
stopping a supply of a driving pulse to the vibration generating stepping motor while applying a driving voltage to the vibration generating stepping motor;
applying the driving voltage to the stepping motor, which does not completely stop, for an optimum braking time according to a motor configuration of the stepping motor, so as to brake the stepping motor; and stopping the applying of the driving voltage to the stepping motor which is rotating under inertia after the elapse of the optimum braking time.

2. The method for controlling stopping of a vibration generating stepping motor as claimed in claim 1, wherein the optimum braking time is made to be a time which enables a rotor of the stepping motor to stop in a predetermined stable stopping position after rotating under inertia when the applying of the driving voltage is stopped at the end of the optimum braking time.

3. The method for controlling stopping of a vibration generating stepping motor as claimed in claim 1, wherein the optimum braking time is made to be a braking time which results at a point in a characteristic curve representing a change in stopping time relative to braking time of the stepping motor, the point being an intersection point of a portion in the characteristic curve whose inclination is steep with a portion in the characteristic curve whose inclination is moderate and where a stopping time is substantially constant.

4. The method for controlling the stopping of a vibration generating stepping motor as claimed in claim 3, wherein the characteristic curve is a characteristic curve in accordance with the mass of a vibration generating weight of the stepping motor.

5. The method for controlling the stopping of a vibration generating stepping motor as claimed in claim 1, wherein the optimum braking time is made to be an optimum braking time for a weight mass of the stepping motor among optimum braking times for each possible weight mass of the stepping motor, the optimum braking times being obtained from a characteristic curve of a stopping time when no brake is applied relative to the weight mass.

6. The method for controlling stopping of a vibration generating stepping motor as claimed in claim 1, wherein the optimum braking time is made to be an optimum braking time for a weight mass of the stepping motor among optimum braking times for each possible weight mass of the stepping motor, the optimum braking times being obtained from a characteristic curve of a stopping time when complete braking is attained relative to the weight mass.

7. The method for controlling stopping of a vibration generating stepping motor as claimed in claim 1, wherein when the supply of driving pulses is stopped, the driving voltage is decreased so that a value of a current supplied to a coil of the stepping motor is decreased to or below a value of a permissible current.

8. An apparatus for controlling stopping of a vibration generating stepping motor, comprising:

a control unit that executes a procedure of a program to output a necessary signal;

a switching circuit that receives the signal output from the control unit and switches a current to a coil of the stepping motor;

a low-voltage power supply and a high-voltage power supply that are connected to a feeding path to the coil;

a power supply cut-off circuit that receives the output signal from the control unit and cuts off the low-voltage power supply and the high-voltage power supply from the feeding path; and a current chopper circuit that receives the output signal from the control unit, and cuts off the high-voltage power supply from the feeding path and executes a constant-current control in the feeding path, the stopping of the stepping motor being controlled by the control unit, wherein the procedure of the program executed by the control unit comprises:

stopping a supply of a driving pulse to the vibration generating stepping motor while applying a driving voltage to the vibration generating stepping motor;

applying the driving voltage to the stepping motor, which does not completely stop, for an optimum braking time according to a motor configuration of the stepping motor, so as to brake the stepping motor; and stopping the applying of the driving voltage to the stepping motor which is rotating under inertia after the elapse of the optimum braking time.

9. The apparatus for controlling stopping of a vibration generating stepping motor as claimed in claim 8, wherein the optimum braking time is made to be a time which enables a rotor of the stepping motor to stop in a predetermined stable stopping position after rotating under inertia when the applying of the driving voltage is stopped at the end of the optimum braking time.

10. The apparatus for controlling stopping of a vibration generating stepping motor as claimed in claim 8, wherein the optimum braking time is made to be a braking time which results at a point in a characteristic curve representing a change in stopping time relative to braking time of the stepping motor, the point being an intersection point of a portion in the characteristic curve whose inclination is steep with a portion in the characteristic curve whose inclination is moderate and where a stopping time is substantially constant.

11. The apparatus for controlling stopping of a vibration generating stepping motor as claimed in claim 10, wherein the characteristic curve is a characteristic curve in accordance with the mass of a vibration generating weight of the stepping motor.

12. The apparatus for controlling stopping of a vibration generating stepping motor as claimed in claim 8, wherein the optimum braking time is made to be an optimum braking time for a weight mass of the stepping motor among optimum braking times for each possible weight mass of the stepping motor, the optimum braking times being obtained from a characteristic curve of a stopping time when no brake is applied relative to the weight mass.

13. The apparatus for controlling stopping of a vibration generating stepping motor as claimed in claim 8, wherein the optimum braking time is made to be an optimum braking time for a weight mass of the stepping motor among optimum braking times for each possible weight mass of the stepping motor, the optimum braking times being obtained from a characteristic curve of a stopping time when complete braking is attained relative to the weight mass.

14. The apparatus for controlling stopping of a vibration generating stepping motor as claimed in claim 8, wherein when the supply of driving pulses is stopped, the driving voltage is decreased so that a value of a current supplied to the coil of the stepping motor is decreased to or below a value of a permissible current.

* * * * *